April 19, 1938.　　　　　V. LINES　　　　　2,114,394
RAKE ATTACHMENT
Filed March 22, 1937
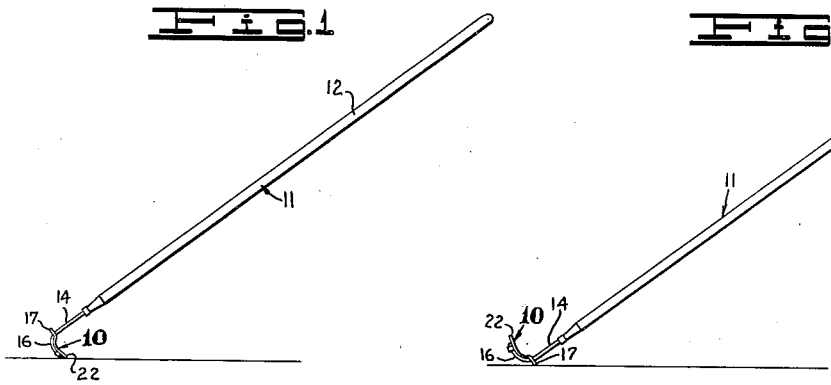
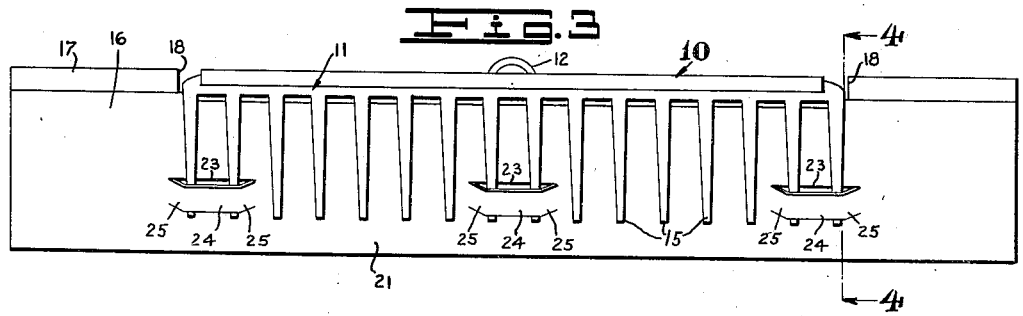
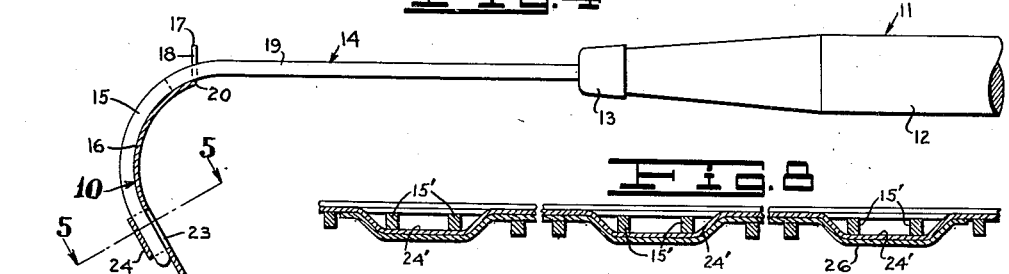
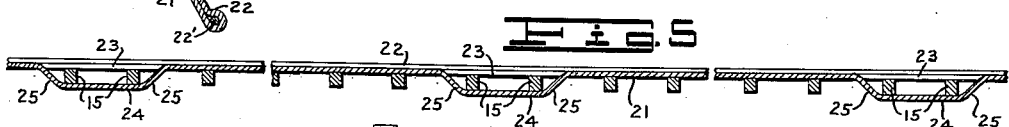
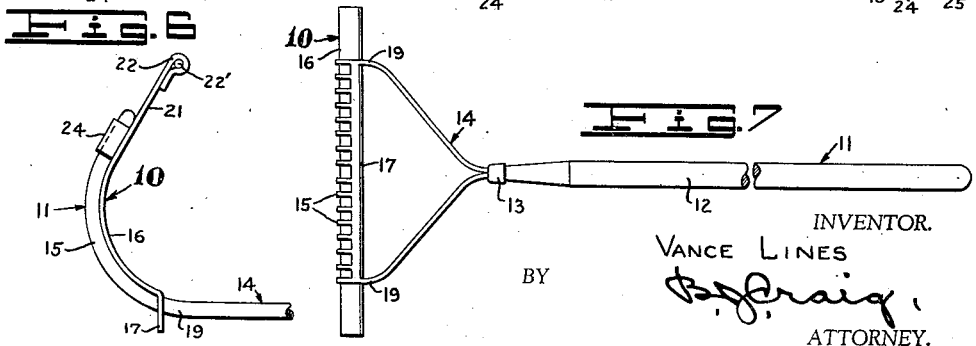
INVENTOR.
VANCE LINES
BY
ATTORNEY.

Patented Apr. 19, 1938

2,114,394

UNITED STATES PATENT OFFICE 2,114,394

RAKE ATTACHMENT

Vance Lines, Pasadena, Calif.

Application March 22, 1937, Serial No. 132,312

6 Claims. (Cl. 55—10)

This invention relates to rake attachment.

The general object of the invention is to provide a rake attachment which may be readily secured on a rake to provide a grader or leveler.

A more specific object of the invention is to provide a rake attachment including a sheet metal member having novel means thereon for attaching the same to a rake.

Another object of the invention is to provide an improved rake attachment including a member having means for securing the same to a rake and including edges which are adapted to perform a grading or leveling action.

A further object of the invention is to provide a rake attachment which is corrugated to provide stiffness.

Other objects and the advantages of my invention will be apparent from the following description taken in connection with the accompanying drawing, wherein:

Fig. 1 is a side elevation showing a rake having my attachment thereon with the rake in use as a leveler;

Fig. 2 is a view similar to Fig. 1 showing the rake in use as a grader;

Fig. 3 is a front view of a rake having my attachment thereon;

Fig. 4 is a section taken on line 4—4 Fig. 3;

Fig. 5 is a section taken on line 5—5 Fig. 4;

Fig. 6 is a fragmentary elevation showing the attachment in place;

Fig. 7 is a top plan view of a rake with my attachment thereon; and

Fig. 8 is a fragmentary perspective view showing a modification of my invention.

Referring to the drawing by reference characters I have shown my invention as embodied in a rake attachment which is indicated generally at 10. As shown this rake attachment is mounted on a rake 11 which may be of the common garden variety and which includes a handle 12, a ferrule 13 and a head portion 14 having tines 15 thereon. The tines 15 are preferably more or less curved although the configuration will be varied according to the intended purpose of the rake.

My attachment indicated generally at 10 is preferably made of light weight galvanized iron and includes a central curved body portion 16 which is curved as indicated in Fig. 4. At one end this curved portion 16 is provided with an upwardly extending flange 17 which is notched as at 18 to receive the edge portions 19 of the head portion 14. The notches are of such a depth that the lower face 20 of the notches (see Fig. 4) engages the upper end of the rounded part 16. The curvature of the part 16 corresponds closely with that of the tines 15. The flange 17 projects beyond the tines 15.

The curved portion 16 includes a downwardly extending portion 21 which is preferably plane and is provided with a lower folded over portion 22 which moves a rigid reinforcing rod 22' as shown in Fig. 4. Adjacent the juncture of the curved portion 16 and the plane portion 21 I provide a plurality of slots 23 from which loops 24 are outwardly pressed as shown in Figs. 3 and 4 to receive pairs of tines 15 as shown in Fig. 3.

The ends of the loops 24 are preferably bevelled as shown at 25 in Fig. 5 so that there is a rather tight binding action between the loops and the teeth. This not only prevents lateral movement of the attachment but also prevents slipping of the loops from the tines so that the parts are securely held together firmly regardless of how the rake with my attachment thereon is used although enabling the attachment to be removed when desired.

In Fig. 8 I show a slight modification of my invention wherein the loops 24' which engage about the tines 15' are provided with a reinforcing strip 26 which is welded to the body at spaced intervals. This reinforcing strip preferably extends across the center of the entire attachment so that added reinforcement for the entire body as well as for the loops 24' is provided.

In the use of my attachment it is placed on the ordinary rake by inserting the proper tines through the slots provided by the portions 24. In case the action is to be that of grading the rake is placed in the position in Fig. 2 whereupon the edge 17 serves to grade and scrape away the higher portions of the area. If a leveling action is to be secured, the rake is placed in the position shown in Fig. 1 so that when the rake is moved the doubled over edge 22 engages the surface being worked upon to level the same.

From the foregoing description it will be apparent that I have invented a novel rake attachment which can be economically manufactured and which is extremely rigid and can be firmly attached in place and which is well adapted for the intended purpose.

Having thus described my invention I claim:

1. A rake attachment comprising a sheet metal body having a curved portion, an upwardly extending flange on said curved portion, said flange including spaced notches, said flange extending to provide a grading edge, said curved portion opposite said flange having thereon a plane portion, said plane portion including a plurality of out pressed loop portions joined to the plane portion.

2. A rake attachment comprising a sheet metal body having a curved portion adapted to engage the tines of a rake, an upwardly extending flange on said curved portion, said flange including spaced notches adapted to receive the edge portion of the head of a rake, said flange extending to provide a grading edge, said curved portion opposite said flange having thereon a plane portion adapted to project beyond the tines of a rake, said plane portion including a plurality of slits without pressed loops between said slits, said loops being adapted to engage rake tines.

3. A rake attachment comprising a sheet metal body having a curved portion adapted to engage the tines of a rake, an upwardly extending flange on said curved portion, said flange including spaced notches adapted to receive the edge portion of the head of a rake, said flange extending to provide a grading edge, said curved portion opposite said flange having thereon a plane portion, said plane portion being of a length to project beyond the tines of a rake, said plane portion including a plurality of slits without pressed loops between said slits, said loops being joined to the plane portion by bevelled portions, said bevelled portions being adapted to engage rake tines to prevent lateral and vertical movement of the attachment on a rake.

4. The combination of a rake including a handle having a tined head thereon and an attachment, said attachment comprising a body having a portion engaging the tines of the rake, an upwardly extending flange on said body, the portion opposite said flange projecting beyond the tines, said projecting portion including a plurality of slits without pressed loops between said slits, said loops engaging said tines to prevent movement of the attachment on the rake.

5. The combination of a rake including a handle having a tined head thereon and an attachment, said attachment comprising a body having a portion engaging the tines of the rake, an upwardly extending flange on said curved portion, said flange including spaced notches receiving the edges of the head of the rake, said flange extending beyond the head portion to provide a grading edge, the portion opposite said flange having a portion projecting beyond the tines, said projecting portion including a plurality of slits without pressed loops between said slits, said loops engaging said tines to prevent lateral and vertical movement of the attachment on the rake.

6. The combination of a rake including a handle having a tined head portion thereon and an attachment, said attachment comprising a sheet metal body having a curved portion engaging the tines of the rake, an upwardly extending flange on said curved portion, said flange including spaced notches receiving the edge portion of the head of the rake, said flange extending beyond the head portion to provide a grading edge, said curved portion opposite said flange having thereon a plane portion with a folded over edge, said folded over edge projecting beyond the tines, said plane portion including a plurality of slits without pressed loops between said slits, said loops being joined to the plane portion by bevelled portions, said bevelled portions engaging said tines to prevent lateral and vertical movement of the attachment on the rake and a strip extending along the plane portion and over the loops to reinforce the latter.

VANCE LINES.